(12) United States Patent
Boyer et al.

(10) Patent No.: US 10,503,641 B2
(45) Date of Patent: Dec. 10, 2019

(54) CACHE COHERENCE FOR PROCESSING IN MEMORY

(71) Applicant: Advanced Micro Devices, Inc., Sunnyvale, CA (US)

(72) Inventors: Michael W. Boyer, Bellevue, WA (US); Nuwan Jayasena, Sunnyvale, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 15/169,118

(22) Filed: May 31, 2016

(65) Prior Publication Data
US 2017/0344479 A1 Nov. 30, 2017

(51) Int. Cl.
*G06F 12/0817* (2016.01)

(52) U.S. Cl.
CPC ...... *G06F 12/0817* (2013.01); *G06F 12/0822* (2013.01); *G06F 2212/1004* (2013.01);
(Continued)

(58) Field of Classification Search
CPC ......... G06F 12/0817; G06F 2212/1004; G06F 12/0822; G06F 2212/1016; G06F 2212/1032
See application file for complete search history.

(56) References Cited

U.S. PATENT DOCUMENTS

| 6,751,705 B1 * | 6/2004 | Solomon ............. G06F 12/0811 711/120 |
| 8,082,400 B1 | 12/2011 | Chang et al. |

(Continued)

OTHER PUBLICATIONS

Agarwal, N., et al., "In-Network Snoop Ordering (INSO): Snoopy Coherence on Unordered Interconnects," 15th International IEEE Symposium on High Performance Computer Architecture, HPCA 2009, Feb. 14-18, pp. 67-78.

(Continued)

*Primary Examiner* — Mano Padmanabhan
*Assistant Examiner* — William E. Baughman
(74) *Attorney, Agent, or Firm* — Zagorin Cave LLP (57) ABSTRACT

A cache coherence bridge protocol provides an interface between a cache coherence protocol of a host processor and a cache coherence protocol of a processor-in-memory, thereby decoupling coherence mechanisms of the host processor and the processor-in-memory. The cache coherence bridge protocol requires limited change to existing host processor cache coherence protocols. The cache coherence bridge protocol may be used to facilitate interoperability between host processors and processor-in-memory devices designed by different vendors and both the host processors and processor-in-memory devices may implement coherence techniques among computing units within each processor. The cache coherence bridge protocol may support different granularity of cache coherence permissions than those used by cache coherence protocols of a host processor and/or a processor-in-memory. The cache coherence bridge protocol uses a shadow directory that maintains status information indicating an aggregate view of copies of data cached in a system external to a processor-in-memory containing that data.

20 Claims, 4 Drawing Sheets

(52) U.S. Cl.
CPC ........... *G06F 2212/1016* (2013.01); *G06F 2212/1032* (2013.01)

(56) References Cited

U.S. PATENT DOCUMENTS

| | | | |
|---|---|---|---|
| 8,922,243 | B2 | 12/2014 | Jayasena et al. |
| 9,135,185 | B2 | 9/2015 | Loh et al. |
| 9,235,528 | B2 | 1/2016 | Hsu et al. |
| 9,244,629 | B2 | 1/2016 | Hsu et al. |
| 9,251,069 | B2 | 2/2016 | Eckert et al. |
| 9,542,316 | B1* | 1/2017 | Forrest ............... G06F 12/0815 |
| 2005/0160230 | A1 | 7/2005 | Doren et al. |
| 2005/0216637 | A1* | 9/2005 | Smith ............... G06F 12/0815 710/305 |
| 2007/0038818 | A1 | 2/2007 | Greenfield et al. |
| 2007/0079090 | A1 | 4/2007 | Rajagopal et al. |
| 2008/0215819 | A1 | 9/2008 | Cantin et al. |
| 2008/0301379 | A1 | 12/2008 | Pong |
| 2009/0094418 | A1* | 4/2009 | Warner ............... G06F 12/082 711/144 |
| 2010/0228945 | A1* | 9/2010 | Deshpande ......... G06F 12/0815 711/207 |
| 2011/0082965 | A1 | 4/2011 | Koka et al. |
| 2011/0296115 | A1* | 12/2011 | Speight ............... G06F 12/0831 711/146 |
| 2012/0124297 | A1 | 5/2012 | Chung et al. |
| 2014/0181417 | A1 | 6/2014 | Loh et al. |
| 2015/0012713 | A1 | 1/2015 | Flanders et al. |
| 2015/0324290 | A1 | 11/2015 | Leidel et al. |
| 2015/0325272 | A1 | 11/2015 | Murphy |

OTHER PUBLICATIONS

Amazon Web Services, "Amazon Elastic Computer Cloud (Amazon EC2)," URL: http://aws.amazon.com/ec2/, admitted prior to Jun. 8, 2010, 9 pages.
Boggs, J., "HT Assist—What is it?" AMD Developer Central Blogs, URL: http://blogs.amd.com/developer/2009/07/21/ht-assist-what-is-it/, Jul. 21, 2009, 2 pages.
Cantin, J., et al., "Improving Multiprocessor Performance with Coarse-Grain Coherence Tracking," Proceedings of 32nd International Symposium on Computer Architecture, Jun. 4-8, 2005, pp. 246-257.
Hybrid Memory Cube Consortium, "About the Technology," URL: http://www.hybridmemorycube.org, Mar. 3, 2016, 2 pages.
Jerger, N. et al., "Virtual Tree Coherence: Leveraging Regions and In-Network Multicast Trees for Scalable Cache coherence," Micro-41, 2008, in 41st IEEE/ACM International Symposium on Microarchitecture, Nov. 8-12, 2008, 12 pages.
Kanter, D., "The Common System Interface: Intel's Future Interconnect," URL: http://www.realworldtech.com/page.cfm?ArticleID=RWT082807020032&p=4, Aug. 28, 2007, 3 pages.
Kim, G., et al., "Multi-GPU System Design with Memory Networks," 47th Annual IEEE/ACM International Symposium on Microarchitecture, 2014, pp. 484-495.
Lenoski, D. et al., "The Stanford Dash Multiprocessor," 1992 IEEE Computer, vol. 25, Issue 3, Mar. 1992, pp. 63-79.
Loh, G., "3D-Stacked Memory Architectures for Multi-Core Processors," In the Proceedings of the 35th ACM/IEEE International Conference on Computer Architecture, Jun. 2008, 14 pages.
Marty, M., and Hill, M., "Virtual Hierarchies to Support Server Consolidation," ISCA '07, Jun. 9-13, 2007, pp. 1-11.
Moshovos, A., "RegionScout: Exploiting Coarse Grain Sharing in Snoop-Based Coherence," ISCA '05, in Proceedings of 32nd International Symposium on Computer Architecture, Jun. 4-8, 2005, 12 pages.
Nair, R., et al., "Active Memory Cube: A processing-in-memory architecture for exascale systems," IBM J. Research & Development, vol. 59, No. 2/3, Paper 17, Mar./May 2015, pp. 17:1-17.14.
Verghese, B., et al., "Operating System Support for Improving Data Locality on CC-NUMA Computer Servers," ASPLOS VII, 1996 ACM, URL: http://www.flash.stanford.edu, Oct. 1996, pp. 279-289.
Wikipedia, "Cache Coherence," URL: http://en.wikipedia.org/wiki/Cache_coherence, downloaded Aug. 2, 2010, 4 pages.
Wikipedia, "Cloud computing," URL: http://en.wikipedia.org/wiki/Cloud_computing, admitted prior to Jun. 8, 2010, 15 pages.
Wikipedia, "Memory Coherence," URL: http://en.wikipedia.org/wiki/Memory_coherence, downloaded Sep. 1, 2010, 2 pages.
Wikipedia, "Non-Uniform Memory Access," URL: http://en.wikipedia.org/wiki/Non-Uniform_Memory_Access, downloaded Sep. 3, 2010, 4 pages.

* cited by examiner

CACHE COHERENCE FOR PROCESSING IN MEMORY

STATEMENT REGARDING FEDERALLY SPONSORED RESEARCH OR DEVELOPMENT

This invention was made with Government support under Prime Contract Number DE-AC52-07NA27344, Subcontract No. B608045 awarded by DOE. The Government has certain rights in the invention.

BACKGROUND

Field of the Invention

The invention is related to processing systems and more particularly to cache coherence in processing systems.

Description of the Related Art

In general, processor-in-memory (i.e., processing-in-memory or processing near memory) techniques improve energy efficiency and performance for data-intensive applications by incorporating processing elements with memory (e.g., random access memory). Incorporating processing-in-memory within a heterogeneous system architecture framework and extending conventional programming models to those systems processors requires cache coherence. Advanced processor-in-memory designs incorporate complex processing engines with their own cache hierarchies. However, for proper operation, a system should maintain coherence between those caches and the caches of host processors (i.e., main processors). Even simple, cacheless processor-in-memory designs must ensure coherence between host caches and data being processed in a processor-in-memory.

Conventional techniques for providing data coherence in systems including a processor-in-memory may include no hardware support and may require software to orchestrate cache coherence between a host and a processor-in-memory. Such solutions require complex programming. Other techniques extend existing cache coherence solutions to encompass any processor-in-memory design. Extending traditional cache coherence solutions, which require integration among all processors in the system, to a processor-in-memory may be impractical because it requires the cache coherence implementation on the host to be aware of how many memory devices (i.e., processor-in-memory devices) the system includes and limits the system design to a particular version or type of host processor, which limits design interoperability and scalability. In addition, since cache coherence protocol designs are complex, such designs are difficult to verify and validate, resulting in undesirability of any changes to existing, proven host cache coherence protocols. Other proposed processor-in-memory cache coherence schemes that do not require any modifications to existing coherence protocols do not permit common usage scenarios such as read sharing (i.e., caching of read-only data at both the host and the processor-in-memory).

Still other cache coherence provisions for processor-in-memory architectures do not account for caches in processor-in-memory devices and rely on extending host-side cache coherence techniques to ensure that host caches remain coherent as processor-in-memory devices modify the data. Such techniques require processor-in-memory devices to use cache line sizes and protocols consistent with those of the host. In addition, those provisions may require storage of one or more dedicated cache coherence state bits along with each cache line in memory (e.g., dynamic random access memory (DRAM)), which requires specialized memory modules and may preclude the use of readily-available memory components. Accordingly, improved techniques for implementing cache coherence for a system incorporating processor-in-memory devices are desired.

SUMMARY OF EMBODIMENTS OF THE INVENTION

In at least one embodiment of the invention, a system includes a processor-in-memory. The processor-in-memory includes shadow directory storage configured to store a bridge coherence state of a data block residing in memory of the processor-in-memory. The bridge coherence state indicates a status of any copies of the data block stored external to the processor-in-memory. The processor-in-memory includes bridge protocol translation logic configured to translate coherence messages between a first cache coherence protocol of the processor-in-memory and a second cache coherence protocol of a host processor. The second cache coherence protocol is different from the first cache coherence protocol. The processor-in-memory includes bridge protocol control logic configured to maintain data coherence of the memory of the processor-in-memory using the coherence messages and contents of the shadow directory storage. The processor-in-memory may include a stack of integrated circuit dies. The memory of the processor-in-memory may be included in a plurality of memory integrated circuit dies of the stack of integrated circuit dies. The bridge protocol control logic and the bridge protocol translation logic may be included in a logic integrated circuit die of the stack of integrated circuit dies. The second cache coherence protocol may use block sizes different from block sizes of the first cache coherence protocol. The processor-in-memory may include at least one cache of a corresponding processor. The at least one cache may be within a coherence domain of the processor-in-memory. The at least one cache may be a write-through cache and the bridge coherence state of the data block may be one of a no-host-copy state, a host-read state, and a host-written state. The at least one cache may be a write-back cache and the bridge coherence state of the data block may be one of a no-host-copy state, a host-read state, a host-written state, and a processor-in-memory-modified state. The system may include the host processor coupled to the processor-in-memory. The host processor may include host bridge translation logic configured to translate coherence messages between the first cache coherence protocol of the processor-in-memory and the second cache coherence protocol of the host processor.

In at least one embodiment of the invention, a method includes storing, in a shadow directory, a bridge coherence state of a data block residing in a memory of a processor-in-memory. The bridge coherence state indicates a status of any copies of the data block stored external to the processor-in-memory. The method includes translating coherence messages between a first cache coherence protocol of the processor-in-memory and a second cache coherence protocol of a host processor. The second cache coherence protocol is different from the first cache coherence protocol. The method includes maintaining data coherence of the memory of the processor-in-memory using the coherence messages and contents of the shadow directory storage. The second cache coherence protocol may use block sizes different from block sizes of the first cache coherence protocol. Maintaining data coherence of the memory of the processor-in-memory may include updating the bridge coherence state of the data block in response to an access to the data block. Maintaining data coherence of the memory of the processor-in-memory may include maintaining coherence of at least one cache of a processor of the processor-in-memory with the memory of the processor-in-memory. The at least one cache may be within a coherence domain of the processor-in-memory. The method may include checking a memory-side cache of the processor-in-memory in response to an access of the memory of the processor-in-memory. The method may include implementing a write-through cache policy from a cache in a coherence domain of the processor-in-memory to the memory-side cache of the processor-in-memory. The bridge coherence state of the data block in the shadow directory may be one of a no-host-copy state, a host-read state, and a host-written state. The method may include implementing a write-back cache policy from a cache in a coherence domain of the processor-in-memory to a memory-side cache of the processor-in-memory. The bridge coherence state of the data block in the shadow directory may be one of a no-host-copy state, a host-read state, a host-written state, and a processor-in-memory-modified state. Maintaining data coherence of the memory of the processor-in-memory may include generating coherence messages in response to a memory access to the data block.

In at least one embodiment of the invention, an apparatus includes a host processor. The host processor includes host bridge translation logic configured to translate coherence messages between a first cache coherence protocol of a processor-in-memory and a second cache coherence protocol of the host processor. The second cache coherence protocol is different from the first cache coherence protocol. The host processor may include a host directory configured to store a host coherence state corresponding to a host copy, stored within the host, of a data block residing in the processor-in-memory. The host processor may include intra-host coherence control logic configured to maintain data coherence of data blocks residing in the host processor using the host directory.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

A cache coherence bridge protocol provides an interface between a cache coherence protocol of a host processor and a cache coherence protocol of a processor-in-memory, thereby decoupling coherence mechanisms of the host processor and the processor-in-memory. The cache coherence bridge protocol requires limited change to existing host processor cache coherence protocols. The cache coherence bridge protocol may be used to facilitate interoperability between host processors and processor-in-memory devices designed by different vendors and both the host processors and processor-in-memory devices may implement coherence techniques among computing units within each processor. The cache coherence bridge protocol may support different granularity of cache coherence permissions than those used by cache coherence protocols of a host processor and/or a processor-in-memory. The cache coherence bridge protocol uses a shadow directory that maintains status information indicating an aggregate view of copies of data cached in a system external to a processor-in-memory containing that data. In contrast, conventional coherence protocols track the state of a local copy of data in a processor.

Figure 1:
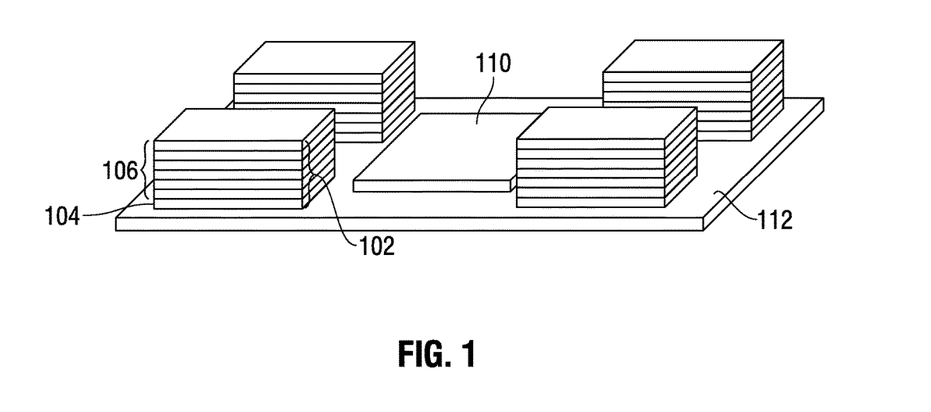
FIG. 1 illustrates a functional block diagram of an exemplary processing system including processor-in-memory devices.

A processor-in-memory may be implemented as processing logic within one or more memory dies or as a separate logic die stacked with one or more memory dies. Referring to FIG. 1, system 100 includes host 110 and four processor-in-memory devices on interposer 112. Processor-in-memory 102 includes processing logic 104, which may be included in a separate die stacked with multiple memory dies 106. Processing logic 104 may include at least one accelerated processing unit (i.e., an advanced processing unit including a central processing unit and a graphics processing unit), central processing unit, graphics processing unit, or other processor and may include coprocessors or fixed-function processing hardware.

Figure 2:
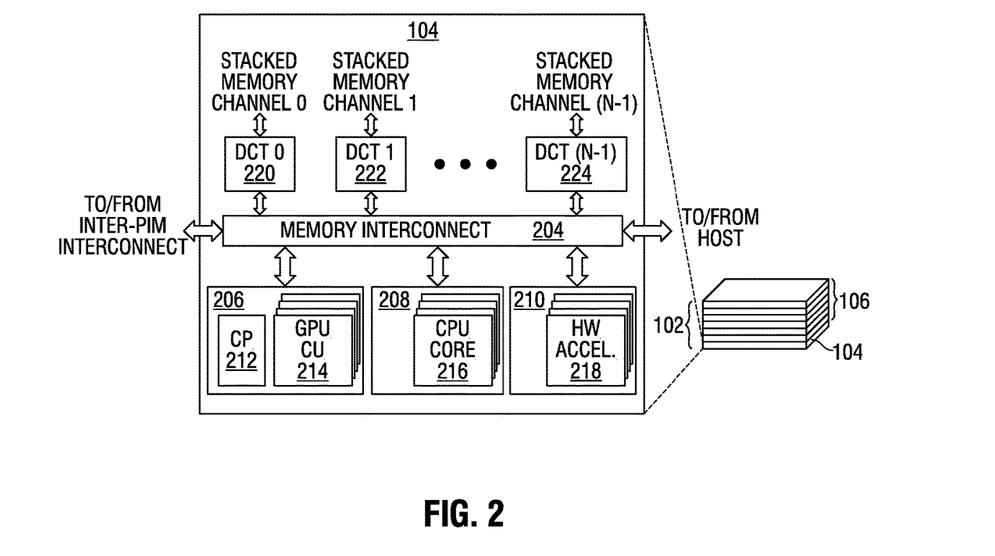
FIG. 2 illustrates a functional block diagram of an exemplary processor-in-memory.

FIG. 2 illustrates exemplary processing logic 104 that includes an advanced processing unit that includes a graphics processing unit, e.g., computing unit cluster 206, which includes multiple graphics processing unit computing units 214. The advanced processing unit may include central processing unit cluster 208, which includes multiple central processing unit cores 216. The advanced processing unit may also include fixed-function hardware 210, which includes multiple hardware accelerators 218. Components within each processor-in-memory 102 (e.g., each graphics processing unit computing unit 214 and each central processing unit core 216 of processing logic 104) may implement hardware cache coherence among them.

Referring back to FIG. 1, host 110 may include multiple processing cores and may implement hardware cache coherence among those processing cores. Host 110 may support cache coherence among multiple host devices via a multi-socket implementation interface (e.g., coherent HyperTransport). Extending any of the conventional cache coherence policies to encompass processor-in-memory requires the host and the processor-in-memory to implement the same cache coherence protocol. That requirement limits the commercial opportunity for processor-in-memory designs by preventing interoperability between host and processor-inmemory designs from different vendors since different vendors have different existing coherence protocols. In addition, supporting high-performance systems with large numbers of memories, each of which may contain a processor-in-memory, requires host and processor-in-memory cache coherence protocols to be scalable to variable numbers (i.e., numbers greater than in systems without processor-in-memory devices and greater than in conventional systems) of coherent nodes, greatly increasing coherence state tracking overhead of conventional techniques.

A cache coherence bridge protocol provides an interface between existing cache coherence protocols (e.g., a host cache coherence protocol and a processor-in-memory cache coherence protocol). The cache coherence bridge protocol uses host-side support that may include the addition of only a single potential sharing device for any particular cache line in the system of an arbitrary number of processor-in-memory devices, resulting in only a negligible increase in overhead and limited additional states needed independent of the number of processor-in-memory devices in the system. The cache coherence bridge protocol includes a processor-in-memory side representation of all components on the host side by a single additional potential sharer, resulting in only a negligible increase in overhead of the processor-in-memory, as well as limiting the number of additional states needed, independent of the nature and number of hosts in the system.

The cache coherence bridge protocol includes a bridge translation unit and a bridge protocol controller implemented on the processor-in-memory. The cache coherence bridge protocol includes a shadow directory stored in the processor-in-memory. The shadow directory stores state information for tracking cache coherence with an outward perspective, i.e., instead of tracking the status of a cached copy on the processor-in-memory, the shadow directory stores bridge coherence states that track an aggregate view of all copies of a data element cached external to the processor-in-memory in which the data element resides. The shadow directory stores a subset of the information that may be contained in a host directory, but from the perspective of the processor-in-memory. In at least one embodiment, the cache coherence bridge protocol uses a subset of cache coherence messages already generated by conventional cache coherence protocols, thus limiting modifications to adapt previously developed and validated cache coherence protocols that are likely to be implemented on a host and within the processor-in-memory.

Figure 3:
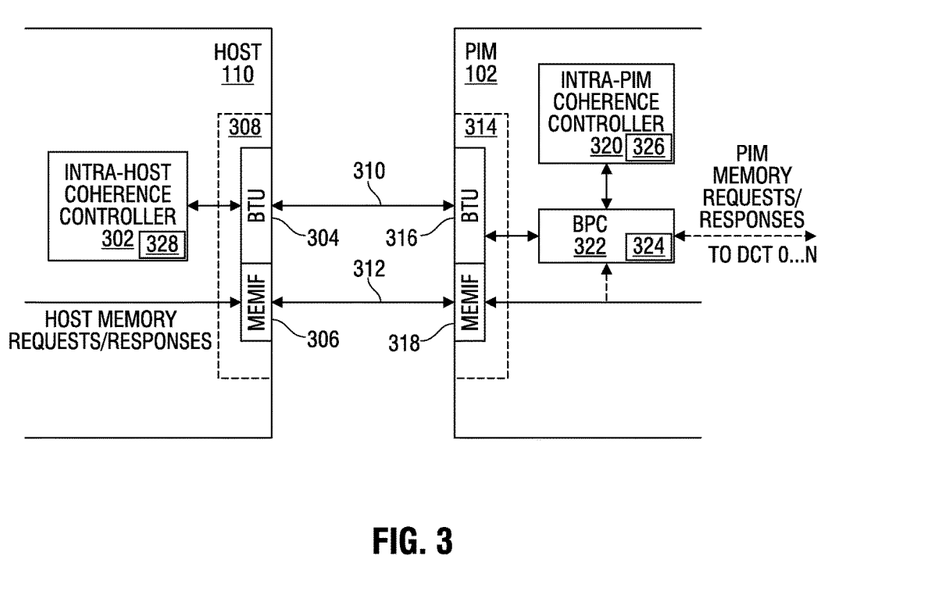
FIG. 3 illustrates a functional block diagram of an exemplary cache coherent link between a host processor and a processor-in-memory consistent with at least one embodiment of the invention.

Referring to FIG. 3, in at least one embodiment of the cache coherence bridge protocol, intra-host coherence controller 302 generates cache coherence messages to processor-in-memory 102 as if processor-in-memory 102 is just another node in the host coherence protocol. Bridge translation unit 304 may translate those cache coherence messages into bridge protocol coherence messages. In processor-in-memory 102, bridge translation unit 316 may translate received cache coherence messages from the host coherence protocol or an intermediate bridge coherence protocol into a form usable by bridge protocol control logic 322. In the opposite direction, bridge protocol control logic 322 generates cache coherence messages consistent with the host coherence protocol or an intermediate bridge coherence protocol for the host based on contents of shadow directory 324, messages from intra-processor-in-memory coherence controller 320 may be based on contents of directory 326, and/or memory requests received or generated by processor-in-memory 102.

Bridge translation unit 316 translates those cache coherence messages received from bridge protocol control logic 322 into bridge protocol messages or into host coherence controller protocol messages. Bridge translation unit 304 of host 110 may translate the cache coherence messages from the bridge protocol into a host protocol. Although illustrated as separate logic, bridge translation unit 304 may be implemented as an integral part of memory interface controller 308 and bridge translation unit 316 may be implemented as an integral part of memory interface controller 314. In at least one embodiment of the cache coherence bridge protocol, intermediate cache coherence messages are not used and bridge translation unit 304 and 316 translate cache coherence messages directly into processor-in-memory cache coherence protocol messages or host cache coherence protocol messages based on predetermined protocol formats that may be configured upon reset of the system or in response to other user configuration.

Bridge protocol control logic 322 observes intra-processor-in-memory coherence messages and in some cases intervenes in, memory accesses (e.g., cache misses) by host 110, of the one or more memory channels of processor-in-memory 102. Since bridge protocol control logic 322 is implemented on processor-in-memory 102, bridge protocol control logic 322 has visibility into all accesses that occur within the memory channels of processor-in-memory 102 (those generated internally within processor-in-memory 102 as well as those generated externally by host 110 or other devices) without generating additional off-device traffic. Functionality of bridge protocol control logic 322 is described further below.

Figure 4:
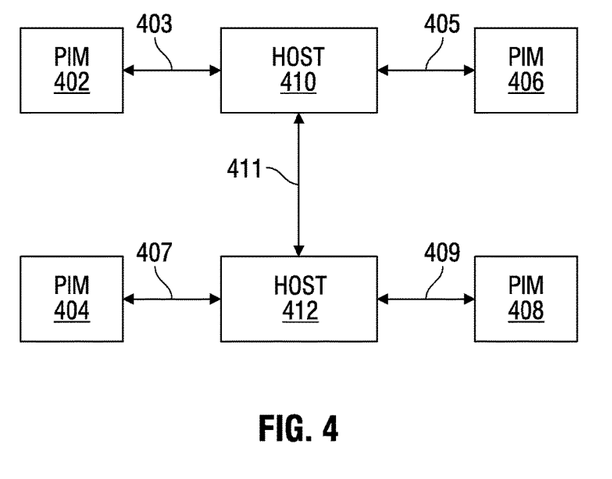
FIG. 4 illustrates a functional block diagram of exemplary cache coherent links between multiple hosts and various processor-in-memory devices consistent with at least one embodiment of the invention.

Referring to FIG. 4, an exemplary system including the cache coherence bridge protocol, includes multiple processor-in-memory devices and host 410 and host 412, which are coupled by host-to-host coherent link 411. Processor-in-memory 402 and 406 are coupled to host 410 by cache coherent bridge protocol link 403 and cache coherent bridge protocol link 405, respectively. Processor-in-memory 404 and processor-in-memory 408 are coupled to host 412 by cache coherent bridge protocol link 407 and cache coherent bridge protocol link 409, respectively. As referred to herein, with regard to a particular memory address, a home processor-in-memory is the processor-in-memory that stores data for the particular address. As referred to herein, a home node is the host attached to the home processor-in-memory for the particular address. The host coherence protocol directory may be distributed such that the home node for coherence directory purposes is the node attached to the processor-in-memory holding the in-memory copy of the data. As referred to herein, a data block is the granularity of coherence tracking between a host and processor-in-memory. The data block is an integer multiple of the granularity of intra-host and host-to-host coherence tracking. In at least one embodiment of a system including the cache coherence bridge protocol, host 410, host 412, processor-in-memory 402, processor-in-memory 404, processor-in-memory 406, and processor-in-memory 408 implement a write-allocate cache coherence policy (i.e., the host or processor-in-memory reads the cache line from memory into a corresponding cache before writing any part of that cache line).

As described above with reference to FIG. 3, the cache coherence bridge protocol uses host-side support, which may include addition of only a single sharing device to host directory 328. That single sharing device in host directory 328 may be used to track the cache coherence state of a home processor-in-memory from the perspective of the host coherence protocol. Referring back to FIG. 4, for example, for a cache line for which processor-in-memory 402 is the home processor-in-memory and that is tracked in a host coherence directory on home node host 410, the host coherence directory on host 410 tracks the cache coherence state of the cache line in processor-in-memory 402. The shadow directory at each processor-in-memory maintains an aggregate view of copies of any data block that may exist elsewhere in the system. In at least in one embodiment, for a cache block whose home processor-in-memory is processor-in-memory 402, the shadow directory on processor-in-memory 402 maintains an aggregate view of any copies of the cache line that may exist in the caches of host 410 or host 412.

Figure 5:
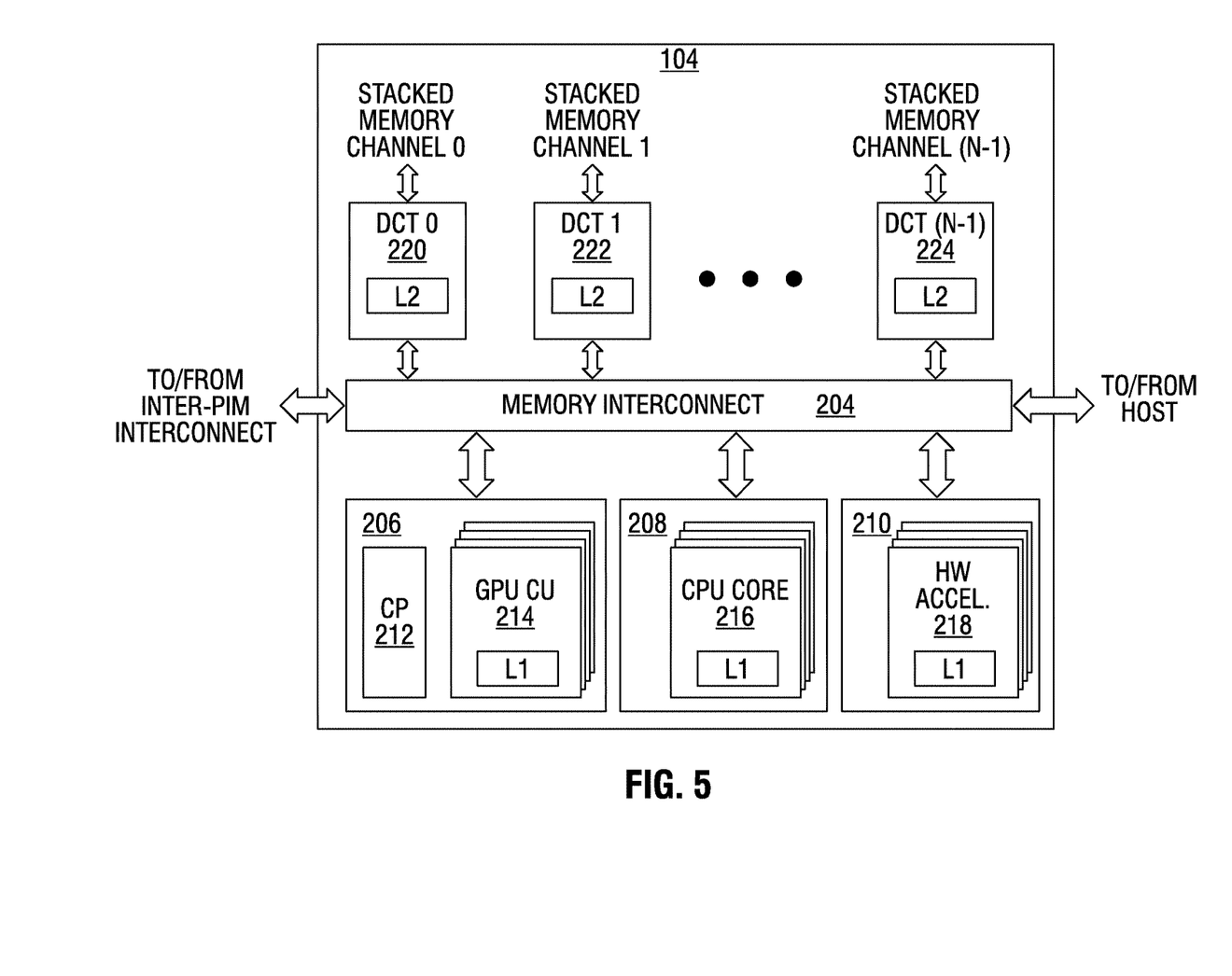
FIG. 5 illustrates a functional block diagram of an exemplary processor-in-memory including an exemplary processor-in-memory cache organization.

In general, a processor-in-memory cache may be either a write-through cache or a write-back cache. If the processor-in-memory cache is a write-through cache, then the processor-in-memory cache need not be checked in response to a memory access by a host. If the processor-in-memory cache is a write-back cache, then servicing a host memory access includes checking the processor-in-memory cache for most recent data. For example, referring to FIG. 5, the level-one caches are write-through caches in a coherence domain on a processor side of memory interconnect 204 and the level-two caches are memory-side caches in the path to memory, external to the coherence domain on the processor side of memory interconnect 204. Every memory access by the host checks the memory-side caches (e.g., level-two caches) external to the processor-in-memory cache coherence domain. In other embodiments, processing logic 104 does not include caches and therefore does not implement intra-processor-in-memory coherence.

Figure 6:
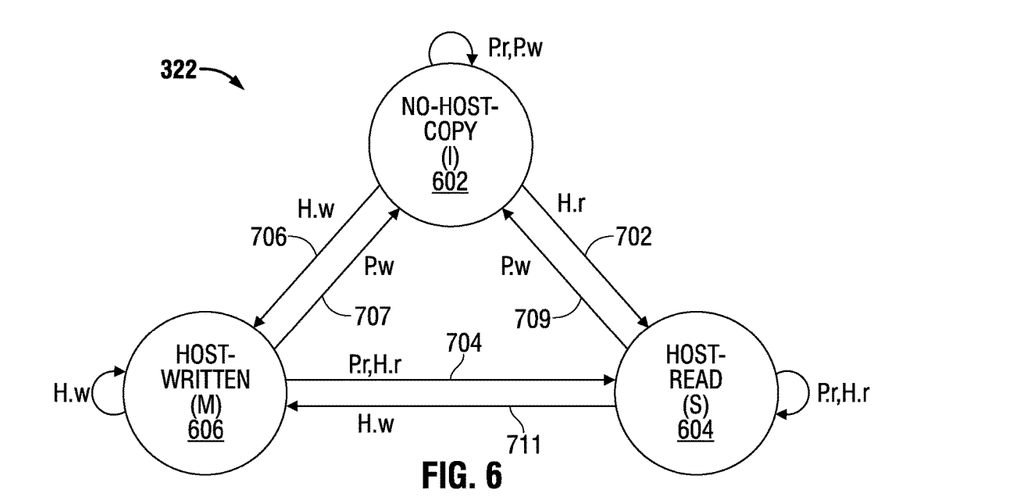
FIG. 6 illustrates a state diagram of an exemplary cache coherence bridge protocol between a host processor and a processor-in-memory having a first caching protocol consistent with at least one embodiment of the invention.

Referring back to FIG. 3, each processor-in-memory 102 includes bridge protocol control logic 322 that tracks a bridge coherence state of each data block stored within memory of that processor-in-memory 102. That bridge coherence state is stored in shadow directory 324. Bridge protocol control logic 322 controls state transitions in shadow directory 324 and stores a corresponding indicator. Referring to FIGS. 3 and 6, in at least one embodiment, for each data block in the processor-in-memory, shadow directory 324 stores an indicator of the following bridge coherence states: no-host-copy (I) state 602, host-read (S) state 604, and host-written (M) state 606. The state diagram corresponds to processor-in-memory 102 having a write-through level-one cache and a memory-side (e.g., level-two) cache outside the processor-in-memory cache coherence domain. Bridge protocol control logic 322 checks the memory-side cache in response to each access to memory (e.g., either from processor-in-memory 102 or from host 110). The no-host-copy (I) state 602 indicates that none of the hosts in the bridge cache coherence domain have stored any part of the data block in a cache memory. This bridge coherence state is analogous to an invalid state in conventional MSI, MESI, MOESI cache coherency protocols, where M represents modified, O represents owned, E represents exclusive, S represents shared, and I represents invalid. The host-read (S) state 604 indicates that one or more of the hosts in the bridge coherence domain have read some part of the data block and may have an unmodified copy in their cache(s), but have not written it. This bridge coherence state is analogous to a shared state in MSI, MESI, MOESI cache coherency protocols. The host-written (M) state 606 indicates that one or more of the hosts in the bridge coherence domain have exclusive ownership of the data block and may have written some part of it (e.g., a host-side core has a copy of the line in modified state for MSI cache coherency protocol, in modified state or exclusive state in MESI cache coherency protocol, or in modified state, owned state, or exclusive state for MOESI cache coherency protocol).

A read of local data (i.e., data associated with a memory address for which processor-in-memory 102 is the home processor-in-memory) by processor-in-memory 102 and a write of local data by processor-in-memory 102 are indicated by P.r and P.w, respectively and bridge protocol control logic 322 responds with an associated state transition of a corresponding entry in shadow directory 324. A read of processor-in-memory local data by host 110 and a write of processor-in-memory local data by host 110 are indicated by H.r and H.w, respectively, and bridge protocol control logic 322 responds with an associated state transition of a corresponding entry in shadow directory 324. Intermediate states and actions on transitions are not illustrated in the state diagram for clarity.

In response to a processor-in-memory read access to a local data block (P.r), if the data block has no-host-copy (I) state 602 or host-read (S) state 604 in shadow directory 324, bridge protocol control logic 322 does not generate any coherence messages outside the processor-in-memory and remains in the current state, no-host-copy (I) state 602 or host-read (S) state 604. If the data block has the host-written (M) state 606 in the shadow directory, bridge protocol control logic 322 generates a read coherence request to the home node attached to the processor-in-memory and transitions (704) the coherence state to host-read (S) state 604. Since that host is also the home node, this will integrate with the host's coherence protocol as if it were any other read request. Processor-in-memory must wait until the coherence request completes, receives a coherence acknowledgement, and updated data are available, before proceeding with the read.

In response to a processor-in-memory write access to local data (P.w), if the data block has no-host-copy (I) state 602 in shadow directory 324, bridge protocol control logic 322 does not generate any coherence messages outside the processor-in-memory and remains in current state no-host-copy (I) state 602. If the data block has host-read (S) state 604 in shadow directory 324, bridge protocol control logic 322 generates an invalidation request to the host and waits for a completion signal before proceeding with the write and transitions (702) to no-host-copy (I) state 602. If the data block has host-written (M) state 606 in shadow directory 324, bridge protocol control logic 322 generates an invalidation request, waits for modified data, and then resumes state transition (707) to no-host-copy (I) state 602.

In response to a read access from the host side that may have originated on the host or another component accessing the memory through the host, (H.r), if the data block has no-host-copy (I) state 602 or host-written (M) state 606 in shadow directory 324, bridge protocol control logic 322 transitions (702 or 704, respectively) the state to host-read (S) state 604. Note that additional read requests from the host side while in host-written (M) state 606 imply that the modified copy in a host cache (which led to the host-written (M) state 606) has already been demoted by the host-side cache coherence protocol. If the data block has host-read (S) state 604 in shadow directory 324, bridge protocol control logic 322 makes no state change.

In response to a read for ownership access from the host side (H.w), if the data block has a no-host-copy (I) state 602 or host-read (S) state 604 in the shadow directory, bridge protocol control logic 322 transitions (706 or 711, respectively) the state to host-written (M) state 606. In addition, bridge protocol control logic 322 invalidates any copies of that data block in any cache in the processor-in-memory cache coherence domain (e.g., level one cache) and responds to the read for ownership access with the requested data. If the data block has a host-written (M) state 606 in shadow directory 324, bridge protocol control logic 322 makes no change to the state and responds to the request with the requested data.

A home node may perform additional host coherence operations. For example, for every state transition from I or S to E, M or O in MSI, MESI and MOESI cache coherency protocols (or equivalent transitions in other protocols), a home node must generate a transition-to-M request to the home processor-in-memory (e.g., processor-in-memory 102). This may be triggered by modifying the host protocol to assume all unallocated lines are in host-read (S) state 604 on the processor-in-memory by default. The transition-to-M request may be in conjunction with a read request (for allocation) preceding a write if the memory interface protocol supports doing so. In at least one embodiment, the home node generates a transition-to-I request to the processor-in-memory in response to a last cached copy being evicted from the entire host-side cache coherence domain. That request may be generated in conjunction with flushing out of dirty data on a final eviction from the host side. This request generation may impact hosts with memory-side last-level caches, as discussed further below. In other embodiments, the host does not generate such request.

Figure 7:
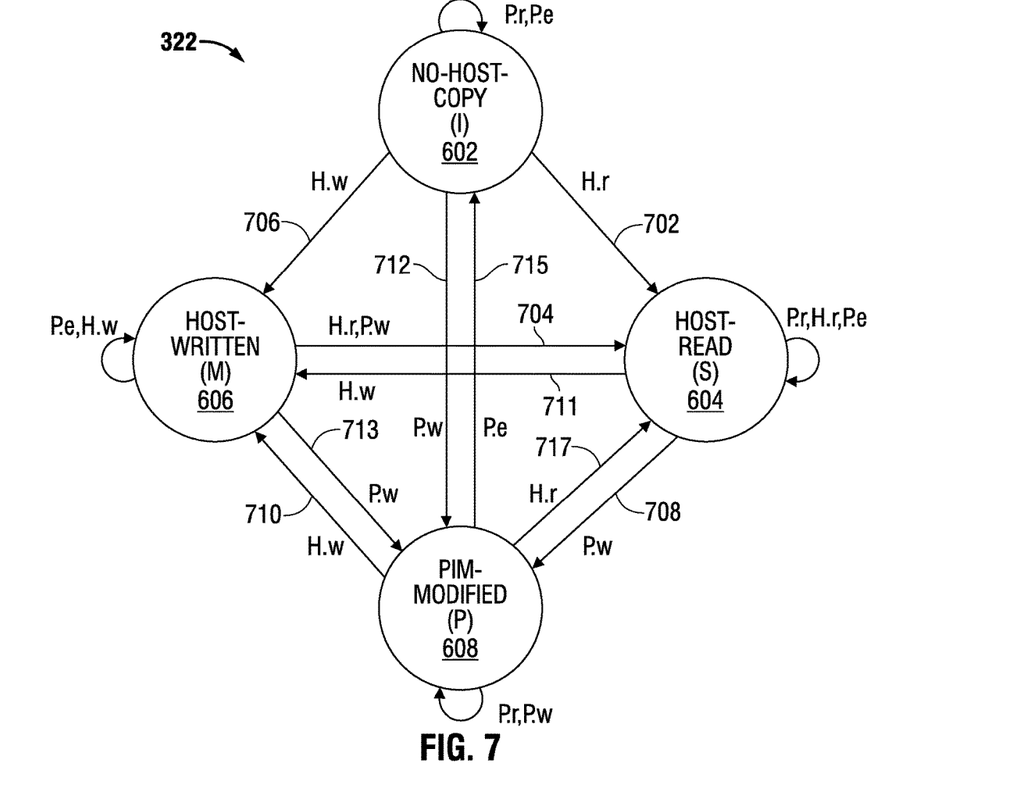
FIG. 7 illustrates a state diagram of an exemplary cache coherence bridge protocol between a host and a processor-in-memory having a second caching protocol consistent with at least one embodiment of the invention.

Referring back to FIG. 5, in at least one embodiment, processor logic 104 includes processor-side (e.g., the level one caches of GPU CUs 214, CPU cores 216, and hardware accelerators 218) write-back caches. As a result, the bridge coherence state of each data block also indicates whether any part of the data block has been modified by processor-in-memory 102 in its processor-side caches using an additional state, processor-in-memory-modified (P) state. FIG. 7 illustrates a modified state diagram for bridge protocol control logic 322 updates to bridge coherence state information in shadow directory 324. If the data block has processor-in-memory-modified (P) state 608 in shadow directory 324, then, in response to any read or write access from outside the processor-in-memory, bridge protocol control logic 322 provides the updated data from a processor-in-memory cache, invalidates any local copy, if needed (if external request is for exclusive or write permissions), and modifies the bridge coherence state of the data block appropriately via transition 710 or transition 717, respectively. In at least one embodiment, when a modified copy of a particular data block in a processor-side cache of the processor-in-memory is evicted from the cache (P.e), the state of the particular data block transitions to no-host-copy (I) state 602 (715) in shadow directory 324.

In at least one embodiment, the home node generates a transition-to-I request to the home processor-in-memory in response to a last cached copy of a particular data block being evicted from the entire host-side cache coherence domain. If the particular data block has host-read (S) state 604 or host-written (M) state 606 in the shadow directory 324, it transitions to no-host-copy (I) state 602 in shadow directory 324. That request may be generated in conjunction with flushing out of dirty data on a final eviction. This request generation may impact hosts with memory-side last-level caches. Such request is optional in the cache coherence bridge protocol (and not illustrated on FIG. 7), and in other embodiments, the home node does not generate such request.

The cache coherence bridge protocols described above are independent of the granularity of coherence tracking. The cache coherence bridge protocol may have a cache-line granularity or may have a coarser granularity (e.g., region coherence, where the region includes more than one cache line). Accordingly, cache coherence bridge protocol implementations having coarser granularities require less state storage and smaller shadow directories. The cache coherence bridge protocols described herein are also implementable with a variable granularity. For example, a portion of the shadow directory may be used to track data blocks having a coarser granularity while another portion of the shadow directory may be used to track data blocks having a finer-granularity.

In at least one embodiment of a cache coherence bridge protocol, coherence granularity of a host coherence protocol is different from the coherence granularity of the cache coherence bridge protocol and the coherence granularity of a processor-in-memory. For example, region coherence, which tracks coherence permissions at a coarser granularity (e.g., 4 KB) than individual cache lines, may greatly reduce coherence traffic (e.g., coherence traffic between a host and a processor-in-memory). Accordingly, a bridge coherence protocol may operate at a coarse granularity (e.g., 4 KB) while an existing host-side coherence protocol continues to operate at a conventional cache line granularity (e.g., 64 B). In addition, support of cache coherence bridge protocol of different coherence granularities of a host coherence protocol and a processor-in-memory cache coherence protocol facilitates interoperability among components from different vendors (e.g., products having different cache line sizes). To improve efficiency, coarser coherence granularities within a system are multiples of finer coherence granularities within that system, which is typical since conventional systems use coherence granularities that are a power-of-two number of bytes.

In at least one embodiment, a bridge translation unit translates a cache coherence request from a coarse-grain coherence permission request (e.g., a 4 KB region request from a processor-in-memory) to a finer-grain coherence permission request (e.g., 64 B cache lines to the host). That translation spans the entirety of the address range of the coarse request (e.g., sixty four 64 B requests to the host in response to a single 4 KB request from the processor-in-memory) and issues the requests to a corresponding coherence controller on the receiving side. The receiving bridge translation unit then collects responses to all requests within that set before signaling completion to the requesting bridge translation unit.

In at least one embodiment, either a sending bridge translation unit or receiving bridge translation unit translates from a fine-grain permission request (e.g., a 64 B request from a host) to a responder that tracks coarse permissions (e.g., 4 KB regions at a processor-in-memory). The sending bridge translation unit or receiving bridge translation unit converts the request to the coarse-grain region that encompasses the address range of the original request. Note that a requestor (e.g., host) may be unaware that it received coherence permissions for a larger region than it requested and may continue to issue additional requests within the same region. In order to reduce inefficiency, the sending bridge translation unit may maintain a cache of recently received region permissions. If subsequent fine-grain requests from the same requestor match entries in this region permission cache, the sending bridge translation unit may signal completion without initiating a request to the other entities.

In systems that generate messages on coherence demotions at a fine granularity, as described above, the sending bridge translation unit may discard demotion messages since they are only used to enhance performance. In other embodiments, at a fine granularity, the sending bridge translation unit collects demotion messages until a contiguous coarse grain region is demoted before communicating the demotion to a recipient that tracks coherence at a coarse granularity. The sending bridge translation unit may communicate fine-grain demotions and expect the receiving bridge translation unit to aggregate them into coarse-grain regions. The sending bridge translation unit that generates the demotion requests to other parts of the coarse-grain region may force demotion of a full coarse-grain region and communicate the region demotion. In at least one embodiment, the sending bridge translation unit may perform one or more of the options described above according to heuristics based on prior memory requests.

Referring back to FIG. 3, shadow directory 324 may be implemented using a separate storage structure (e.g., SRAM either in processor-in-memory 102 in a separate die or distributed across stacked with processor-in-memory 102) to store the bridge coherence state of each data block within the processor-in-memory. That storage structure may be physically distributed across multiple memory channels and each memory channel of the processor-in-memory may maintain a separate table, which may alleviate bandwidth limitations to this structure.

In at least one embodiment, shadow directory 324 is integrated with the memory and stores a bridge coherence state for each data block in a subset of the bits of the same row of memory that stores the data block, e.g., in a design that allows a DRAM to be customized to include sufficient additional bits and does not require non-standard addressing support. In at least one embodiment, shadow directory 324 is located in a subset of the memory space of each memory channel dedicated to store bridge coherence state separately from the data blocks (e.g., an upper-most address range of the memory space). The address mapping may be designed such that the cache coherence state for a particular memory address always resides on a channel other than the one that contains the data for the particular memory address to reduce DRAM page conflicts. Provided the address space is distributed among processor-in-memory devices and among channels within a processor-in-memory at a relatively fine grain (i.e., at a granularity much less than the capacity of a single memory channel), that mapping technique may introduce relatively little special addressing support. A shadow directory implemented using DRAM and the subset of memory space alternatives described, may be augmented with an SRAM cache to store recently accessed shadow directory entries to reduce DRAM accesses needed to access and modify shadow directory states.

From a processor-in-memory perspective, a memory-side, last-level cache of the host that is not included in a host-side coherence domain is viewed as part of the host. The cache coherence bridge protocol captures the states of data blocks cached on the host by default in the shadow directory tracking scheme described above. The cache coherence bridge protocol may modify the memory-side last-level cache as if it were any other host cache in response to cache coherence requests from the processor-in-memory, including requests for modified data from host caches, if the memory-side cache is the only one that contains that data, i.e., no copies of the data exist in other caches tracked by the host directory. From the host perspective, the memory-side cache requires no special treatment from the cache coherence bridge protocol. However, if evictions from a directory-tracked host cache are signaled to the processor-in-memory, as described above, these messages should appropriately account for data in host memory-side caches. Those messages do not communicate demotions to the processor-in-memory if the state in the memory-side cache is inconsistent with those messages. Optionally, the cache coherence bridge protocol generates such messages in response to a data block eviction from the memory-side last-level cache.

Thus a cache coherence bridge protocol has been described. Structures described herein may be implemented using software executing on a processor (which includes firmware) or by a combination of software and hardware. Software, as described herein, may be encoded in at least one tangible (i.e., non-transitory) computer readable medium. As referred to herein, a tangible computer-readable medium includes at least a disk, tape, or other magnetic, optical, or electronic storage medium. The description of the invention set forth herein is illustrative, and is not intended to limit the scope of the invention as set forth in the following claims. For example, while the invention has been described in an embodiment in which processor-in-memory devices include caches, one of skill in the art will appreciate that the teachings herein can be utilized with simple processor-in-memory devices that do not include caches, but require host caches to be coherent with processor-in-memory accesses. Variations and modifications of the embodiments disclosed herein, may be made based on the description set forth herein, without departing from the scope of the invention as set forth in the following claims.

What is claimed is:

1. A system comprising:
   a processor-in-memory implementing a first cache coherence protocol, the processor-in-memory comprising:
      a memory die; and
      a logic integrated circuit die stacked with the memory die, the logic integrated circuit die comprising:
         at least one cache of a corresponding processor storing a copy of a data block residing in the memory die;
         a processor-in-memory directory configured to store a processor-in-memory coherence state of the data block, the processor-in-memory coherence state indicating a status of the copy of the data block in the at least one cache;
         an intra-processor-in-memory coherence controller configured to maintain data coherence of the data block using contents of the processor-in-memory directory;
         shadow directory storage configured to store a bridge coherence state of the data block, the bridge coherence state being separate and distinct from the processor-in-memory coherence state, representing all components external to the processor-in-memory as a single additional potential sharing device, and indicating a status of any external copies of the data block stored externally to the processor-in-memory; and
         bridge protocol translation logic configured to receive coherence messages from intra-host coherence control logic of a host processor coupled to the processor-in-memory, translate the coherence messages from a second cache coherence protocol of the host processor to the first cache coherence protocol, and provide translated coherence messages to bridge protocol control logic, the second cache coherence protocol being different from the first cache coherence protocol; and the bridge protocol control logic configured to maintain data coherence of the data block using the translated coherence messages and contents of the shadow directory storage.

2. The system, as recited in claim 1, wherein the second cache coherence protocol uses block sizes different from block sizes of the first cache coherence protocol.

3. The system, as recited in claim 1, wherein the at least one cache is within a coherence domain of the processor-in-memory maintained by the intra-processor-in-memory coherence controller.

4. The system, as recited in claim 1,
wherein the at least one cache is a write-through cache and the bridge coherence state of the data block is a no-host-copy state, a host-read state, or a host-written state, and
wherein the no-host-copy state indicates that no host processors in a bridge coherence domain have stored any part of the data block in a host cache, the host-read state indicates that at least one host processor in the bridge coherence domain has read a portion of the data block and may have an unmodified copy of the portion in a host cache, and the host-written state indicates that at least one host processor in the bridge coherence domain has exclusive ownership of the data block and may have written the data block in a host cache.

5. The system, as recited in claim 1, wherein the at least one cache is a write-back cache and the bridge coherence state of the data block is a no-host-copy state, a host-read state, a host-written state, or a processor-in-memory-modified state, wherein the no-host-copy state indicates that no host processors in a bridge coherence domain have stored any part of the data block in a host cache, the host-read state indicates that at least one host processor in the bridge coherence domain has read a portion of the data block and may have an unmodified copy of the portion in a host cache, the host-written state indicates that at least one host processor in the bridge coherence domain has exclusive ownership of the data block and may have written the data block in a host cache, and the processor-in-memory-modified state indicates whether any part of the data block has been modified by the processor-in-memory in the at least one cache.

6. The system, as recited in claim 3, wherein the processor-in-memory further comprises:
a memory-side cache outside the coherence domain of the processor-in-memory, wherein the bridge protocol control logic is configured to check the status of any copies of the data block stored in the memory-side cache in response to a memory access to the data block.

7. The system, as recited in claim 1, further comprising:
the host processor comprising:
host bridge translation logic configured to translate coherence messages received from the processor-in-memory from the first cache coherence protocol to the second cache coherence protocol.

8. The system, as recited in claim 7, wherein the host processor further comprises:
a memory-side cache outside a coherence domain of the host and outside a coherence domain of the processor-in-memory, wherein the shadow directory storage captures the status of any copies of the data block stored in the memory-side cache.

9. The system, as recited in claim 7, wherein the host processor further comprises:
a host directory configured to store a host coherence state of a host copy of the data block, the host copy being stored within the host processor; and
the intra-host coherence control logic configured to maintain data coherence of the host copy of the data block with the data block residing in the processor-in-memory using the host directory.

10. A method comprising:
storing, in a shadow directory, a bridge coherence state of a data block residing in a memory of a processor-in-memory implementing a first cache coherence protocol, the bridge coherence state being separate and distinct from a processor-in-memory coherence state of the data block, representing all components external to the processor-in-memory as a single additional potential sharing device, and indicating a status of any external copies of the data block stored externally to the processor-in-memory; and
storing a copy of the data block in at least one cache of a corresponding processor of the processor-in-memory;
storing in a processor-in-memory directory, the processor-in-memory coherence state of the data block, the processor-in-memory coherence state indicating a status of the copy of the data block residing in the at least one cache; and
maintaining data coherence of the data block residing in the at least one cache using the processor-in-memory directory;
translating coherence messages received from intra-host coherence control logic of a host processor coupled to the processor-in-memory from a second cache coherence protocol of the host processor to the first cache coherence protocol, the second cache coherence protocol being different from the first cache coherence protocol; and
maintaining data coherence of the data block using the translated coherence messages and contents of the shadow directory.

11. The method, as recited in claim 10, wherein the second cache coherence protocol uses block sizes different from block sizes of the first cache coherence protocol.

12. The method, as recited in claim 10, wherein maintaining data coherence of the memory of the processor-in-memory comprises updating the bridge coherence state of the data block in response to an access to the data block.

13. The method, as recited in claim 10, wherein maintaining data coherence of the memory of the processor-in-memory comprises:
maintaining coherence of the at least one cache with the memory of the processor-in-memory, the at least one cache being within a coherence domain of the processor-in-memory.

14. The method, as recited in claim 10, further comprising:
checking a memory-side cache of the processor-in-memory in response to an access of the memory of the processor-in-memory; and
implementing a write-through cache policy from a cache in a coherence domain of the processor-in-memory to the memory-side cache of the processor-in-memory, wherein the bridge coherence state of the data block in the shadow directory is a no-host-copy state, a host-read state, or a host-written state,
wherein the no-host-copy state indicates that no host processors in a bridge coherence domain have stored any part of the data block in a host cache, the host-read state indicates that at least one host processor in the bridge coherence domain has read a portion of the data block and may have an unmodified copy of the portion in a host cache, and the host-written state indicates that at least one host processor in the bridge coherence domain has exclusive ownership of the data block and may have written the data block in a host cache.

15. The method, as recited in claim 10, further comprising:
implementing a write-back cache policy from a cache in a coherence domain of the processor-in-memory to a memory-side cache of the processor-in-memory,
wherein the bridge coherence state of the data block in the shadow directory is a no-host-copy state, a host-read state, a host-written state, or a processor-in-memory-modified state, and
wherein the no-host-copy state indicates that no host processors in a bridge coherence domain have stored any part of the data block in a host cache, the host-read state indicates that at least one host processor in the bridge coherence domain has read a portion of the data block and may have an unmodified copy of the portion in a host cache, the host-written state indicates that at least one host processor in the bridge coherence domain has exclusive ownership of the data block and may have written the data block in a host cache, and the processor-in-memory-modified state indicates whether any part of the data block has been modified by the processor-in-memory in the at least one cache.

16. The method, as recited in claim 10, wherein maintaining data coherence of the data block comprises generating coherence messages in response to a memory access to the data block.

17. The method, as recited in claim 10, further comprising:
storing a host coherence state of a host copy of the data block within a host directory of the host processor; and
maintaining data coherence of the host copy of the data block residing in the host processor with the data block residing in the processor-in-memory using the host coherence state.

18. An apparatus comprising:
a host processor comprising:
intra-host coherence control logic configured to maintain data coherence of data blocks residing in a processor-in-memory using a host directory; and
host bridge translation logic configured to receive coherence messages from the processor-in-memory, translate the coherence messages from a first cache coherence protocol of the processor-in-memory using a shadow directory of the processor-in-memory to a second cache coherence protocol using the host directory of the host processor, and provide translated coherence messages to the intra-host coherence control logic, the second cache coherence protocol being different from the first cache coherence protocol,
wherein the processor-in-memory includes a processor-in-memory directory that stores a processor-in-memory coherence state of any copies of the data blocks stored within at least one cache of a corresponding processor of the processor-in-memory, and
wherein the shadow directory stores a bridge coherence state of the data block separate and distinct from the processor-in-memory coherence state, representing all components external to the processor-in-memory as a single additional potential sharing device, and indicating status information for the copies of the data blocks stored in a cache memory of the host processor.

19. The apparatus, as recited in claim 18,
wherein the host processor further comprises:
the host directory configured to store host coherence state information corresponding to the copies of the data blocks.

20. The apparatus, as recited in claim 18, wherein the second cache coherence protocol uses block sizes different from block sizes of the first cache coherence protocol.

* * * * *